(12) United States Patent
Saliba et al.

(10) Patent No.: US 9,459,047 B2
(45) Date of Patent: Oct. 4, 2016

(54) WASTE HEAT SYSTEM

(75) Inventors: Charbel Saliba, Garfield HTS, OH (US); Jon Tipton, Aurora, OH (US); Chris T. Vild, Chagrin Falls, OH (US)

(73) Assignee: PYROTEK, INC., Spokane, WA (US)

( * ) Notice: Subject to any disclaimer, the term of this patent is extended or adjusted under 35 U.S.C. 154(b) by 754 days.

(21) Appl. No.: 13/390,367

(22) PCT Filed: Aug. 16, 2010

(86) PCT No.: PCT/US2010/045607
§ 371 (c)(1),
(2), (4) Date: May 16, 2012

(87) PCT Pub. No.: WO2011/020092
PCT Pub. Date: Feb. 17, 2011

(65) Prior Publication Data
US 2012/0217683 A1 Aug. 30, 2012

Related U.S. Application Data

(60) Provisional application No. 61/233,967, filed on Aug. 14, 2009.

(51) Int. Cl.
*C22B 1/00* (2006.01)
*C21C 5/38* (2006.01)
(Continued)

(52) U.S. Cl.
CPC ............ *F27D 13/002* (2013.01); *C21C 5/565* (2013.01); *C22B 1/005* (2013.01);
(Continued)

(58) Field of Classification Search
CPC ..... C21C 5/565; C21C 5/52; C21C 2100/06; C21C 5/5217; C21C 5/527; C21C 5/567; C21C 1/005; F27D 13/002; F27D 17/004; F27D 17/001; F27D 17/003; F27D 17/008; F27D 3/0025; F27D 3/003; F27D 3/0031; F27D 3/10; F27D 3/14; C22B 1/005; C22B 21/0007; C22B 21/0092; Y02P 10/214; Y02P 10/216; Y02P 10/218; Y02W 30/54
USPC ................. 266/44, 144, 145, 138, 205, 901; 432/98, 176; 373/8, 81, 78
See application file for complete search history.

(56) References Cited

U.S. PATENT DOCUMENTS 3,645,515 A * 2/1972 Kemmetmueller ............. 432/17
4,010,935 A * 3/1977 Stephens ......................... 266/44
(Continued)

FOREIGN PATENT DOCUMENTS

GB 2 083 181 3/1982
GB 2083181 * 3/1982 ............ F27D 13/00
(Continued)

*Primary Examiner* — Scott Kastler
*Assistant Examiner* — Michael Aboagye
(74) *Attorney, Agent, or Firm* — Fay Sharpe LLP

(57) ABSTRACT

A preheat charging system for preheating scrap metal prior to delivery to a melting furnace. The system includes a preheating station having a heating chamber adapted to receive scrap metal. Hot gas from a burner chamber is circulated around the scrap metal. The burner chamber is adapted to receive exhaust gas from a hot exhaust gas source such as a melting furnace. A burner apparatus is mounted within the burner chamber in a flow path of an exhaust inlet port. The burner is configured to supply supplemental heat on demand to the heating chamber to supplement the hot exhaust gas. A first fan can be provided to direct exhaust air from a furnace to the burner chamber. A second fan can be provided for directing air into the burner apparatus.

10 Claims, 4 Drawing Sheets

(51) Int. Cl.
    *F27D 13/00*     (2006.01)
    *C21C 5/56*     (2006.01)
    *C22B 21/00*     (2006.01)

(52) U.S. Cl.
    CPC ...... *C22B 21/0007* (2013.01); *C22B 21/0092* (2013.01); *C21C 2100/06* (2013.01); *Y02P 10/214* (2015.11); *Y02P 10/216* (2015.11); *Y02P 10/218* (2015.11)

(56) References Cited

U.S. PATENT DOCUMENTS 4,083,675 A * 4/1978 Fellnor et al. .................. 432/1
4,736,383 A * 4/1988 Meierling ..................... 373/78
5,122,181 A * 6/1992 Dube et al. ................. 75/10.21
6,024,912 A * 2/2000 Wunsche ...................... 266/44

FOREIGN PATENT DOCUMENTS

| | | |
|---|---|---|
| GB | 2155160 A | 9/1985 |
| GB | 2 257 239 | 1/1993 |
| JP | 62-225889 | 10/1987 |
| JP | 2000-292074 A | 10/2000 |
| WO | WO 99/28513 | 6/1999 |

\* cited by examiner

WASTE HEAT SYSTEM

RELATED APPLICATIONS

This application claims the benefit of U.S. Provisional Application Ser. No. 61/233,967, which is hereby incorporated herein by reference in its entirety.

BACKGROUND

A need exists for an efficient furnace system which may be used to melt scrap metal. The most commonly used furnace systems for melting scrap, particularly non-ferrous metal scrap, require preheating of the scrap at one location and then moving the preheated scrap into a furnace for melting. Heretofore, the relatively low cost of fuel for a furnace made it uneconomical to employ sophisticated devices or techniques in an effort to reduce operating costs. However, it is becoming necessary that a melting furnace, or the like, be operated more efficiently.

A conventional secondary aluminum melting plant operates generally according to the following process. The scrap is sorted and thermally purified and dried in processing equipment. The scrap is then dumped into the furnace where it is melted, but it is known that dumping cold metals into a furnace can cause the furnace temperature to be reduced to an extent which is detrimental to furnace efficiency. Furthermore, when cold metals are dumped into molten metal, there is a danger of explosion due to the moisture which may be present in such cold metals.

One method to operate a furnace in a more efficient manner is the utilization of some form of device to extract heat from the hot gases discharged from the furnace and using the extracted gases for one or more purposes in connection with the operation of the furnace. It has been proposed to heat and melt a charge of material in a melting chamber and convey the hot exhaust gases from the melting chamber to another chamber for the purpose of preheating another charge of material.

Accordingly, it is desirable to provide a continuous preheat charging system. The present invention is directed toward providing an improved scrap preheating apparatus.

BRIEF DESCRIPTION

In one aspect of the present invention, a continuous preheat charging method is disclosed. This method includes the steps of transferring scrap from a receiving point to a furnace and preheating the scrap during said transfer.

In addition, the present invention is directed to a continuous preheat charging system which includes means for transferring scrap from a receiving point to a furnace. The system also includes means for preheating scrap adjacent the discharge point of the transferring means prior to delivery of the preheated scrap to a melting furnace.

Advantageously, the scrap transferring means is a scrap charge transfer conveyor with the receiving point being a scrap receiving end of the conveyor and a discharge point being a scrap discharge end of the conveyor adjacent the melting furnace. The preheating means is preferably a preheating station which is adapted to receive exhaust gasses from the melting furnace and supplement the same with burner heat. The burner can be a gas or electric burner or heating element. Each of these heating mechanisms are hereinafter referred to interchangeably as a burner apparatus.

In another aspect, a preheat charging system for preheating scrap metal prior to delivery to a melting furnace comprises a preheating station and a burner chamber. The preheating station includes a heating chamber, a scrap inlet for receiving scrap metal into the heating chamber, a scrap outlet for discharging scrap metal from the heating chamber, and an inlet port for receiving hot gas into the heating chamber for preheating the scrap metal. The burner chamber includes an exhaust inlet port for receiving hot exhaust gas from a hot exhaust gas source, and a burner apparatus mounted within the chamber in a flow path of the exhaust inlet port, the burner configured to supply supplemental heat on demand to the heating chamber to supplement the hot exhaust gas, and a hot gas outlet port. The hot gas outlet port is in fluid communication with the inlet port of the preheating station for delivering hot gas thereto for preheating the scrap metal.

The hot exhaust gas source can include a melting furnace, such as a melting furnace in which the scrap metal will be subsequently melted after preheating. The system can further include an exhaust gas fan for propelling the hot exhaust gas from the hot exhaust gas source towards the exhaust inlet port of a burner chamber. The preheating chamber can include a conveyance mechanism, such as a conveyor, for transporting the scrap metal between the scrap inlet and the scrap outlet. The burner apparatus can be positioned to fire or otherwise direct heat in a general direction of the hot gas outlet port, and can have an adjustable degree of penetration into the burner chamber. The burner can also be adjustably mounted within the burner chamber in at least one of the horizontal or vertical directions. A burner fan can be provided for supplying air or other gas to the burner apparatus for combustion of a fuel.

In accordance with another aspect, a preheater for use in a scrap metal melting furnace system for preheating the scrap metal prior to delivery to the melting furnace comprises a burner chamber including an exhaust inlet port for receiving hot exhaust gas from a hot exhaust gas source, a burner mounted within the chamber in a flow path of the exhaust inlet port, the burner configured to supply supplemental heat on demand to the preheat chamber to supplement the hot exhaust gas, and a hot gas outlet port connectable to a preheating chamber of the scrap metal melting furnace system.

In accordance with yet another aspect, a method of preheating scrap metal prior to feeding the scrap material to a melting furnace comprises transporting scrap metal to a preheating station, circulating hot gas around the scrap metal to heat the scrap metal, and transporting the scrap metal from the preheating station to the melting furnace. The step of circulating hot gas around the scrap metal includes receiving exhaust gases from the melting furnace, increasing, if needed, the thermal energy of the exhaust gas with a burner (gas or electric), and directing the hot gas to the preheating station.

The transporting steps and circulating step can all be performed continuously as scrap material passes through the preheating station. The step of receiving exhaust gasses from the melting furnace can include modulating the flow of the exhaust gasses with an exhaust gas fan. The step of increasing the thermal energy of the exhaust gas with a burner can include forcing air through a conduit to the burner with a burner fan. The methods can further include the step of maintaining a substantially constant mass flow rate of hot gas being circulated around the scrap metal by controlling an exhaust gas fan supplying air to the heated chamber.

Still other advantages and features of the present invention will become apparent from a consideration of the following specification taken in conjunction with the accompanying drawings.

DETAILED DESCRIPTION OF THE PREFERRED EMBODIMENT

Figure 1:
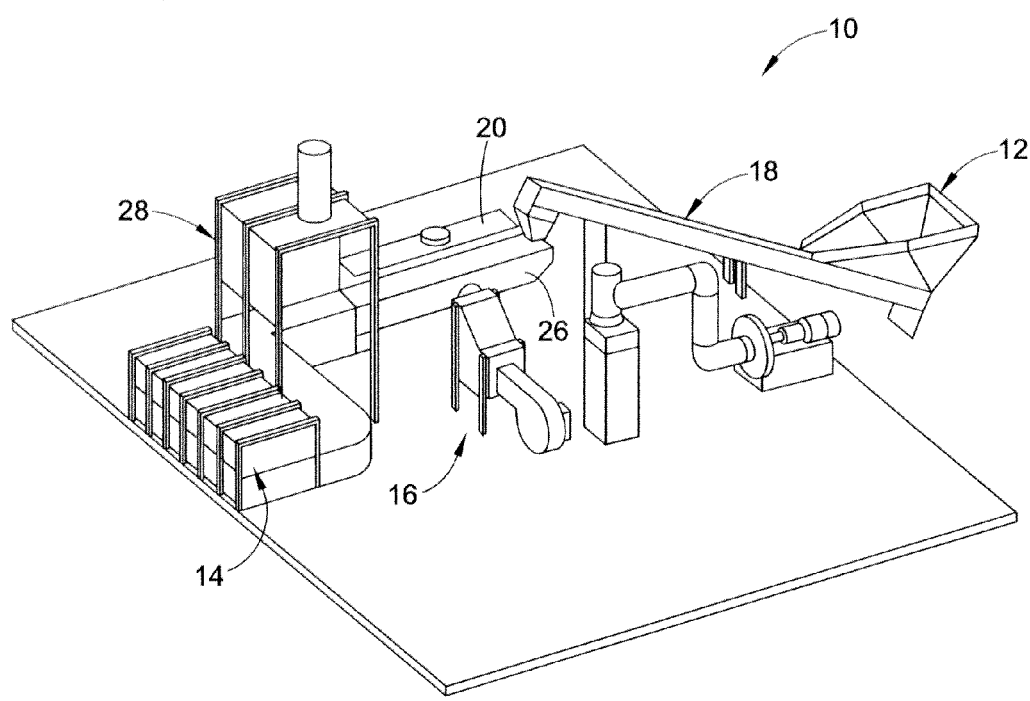
FIG. 1 is a perspective view illustrating a continuous preheat charging system in accordance with the present invention.

Referring to FIG. 1, a continuous preheat charging system 10 of the present invention is illustrated which includes means for transferring metal scrap material from a hopper 12 to a melting furnace 14. The system includes preheating station 16 which delivers heated air to the scrap prior to delivery to melting furnace 14.

Generally, hopper 12 receives scrap and transfers the scrap to a transfer conveyor 18. The transfer conveyor 18 in turn delivers the scrap to a preheating conveyor 20 into which preheating station 16 introduces the heated air. The preheating conveyor 20 includes a scrap receiving end 26 for receiving scrap from the transfer conveyor 18 and a scrap discharge end 28 adjacent the melting furnace. Optionally, a Pyrotek LOTUSS® scrap submergence system will be provided in association with the furnace as the point at which preheated scrap is introduced.

Figure 2:
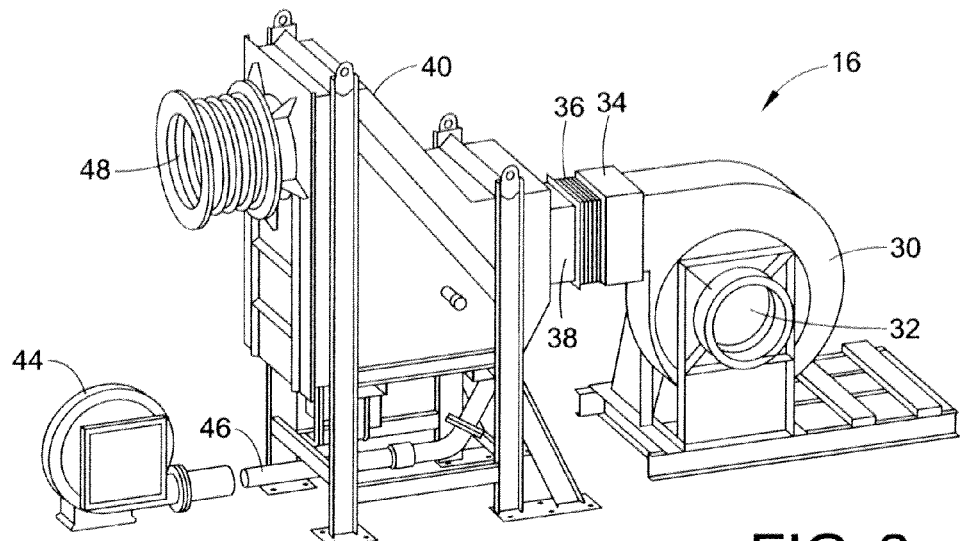
FIG. 2 is a perspective view of the preheating station.
Figure 3:
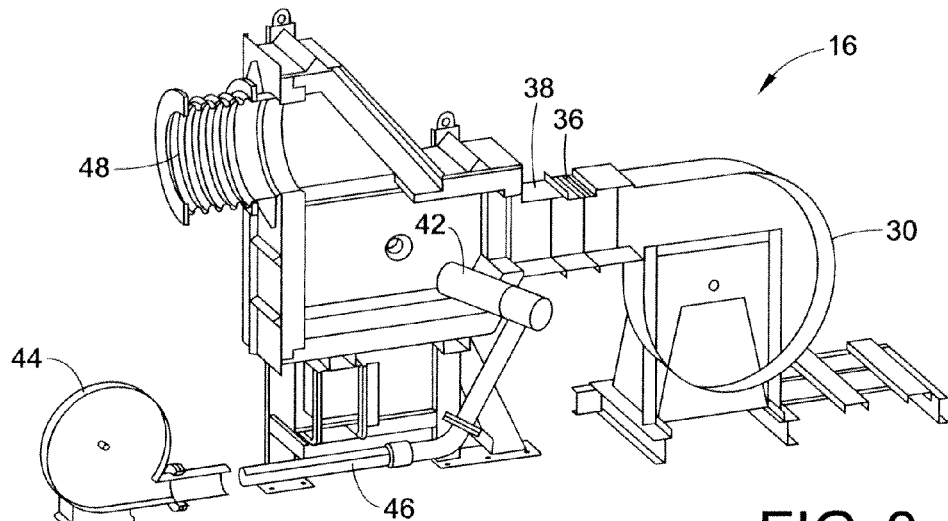
FIG. 3 is a cross-sectional view of the preheating station.
Figure 4:
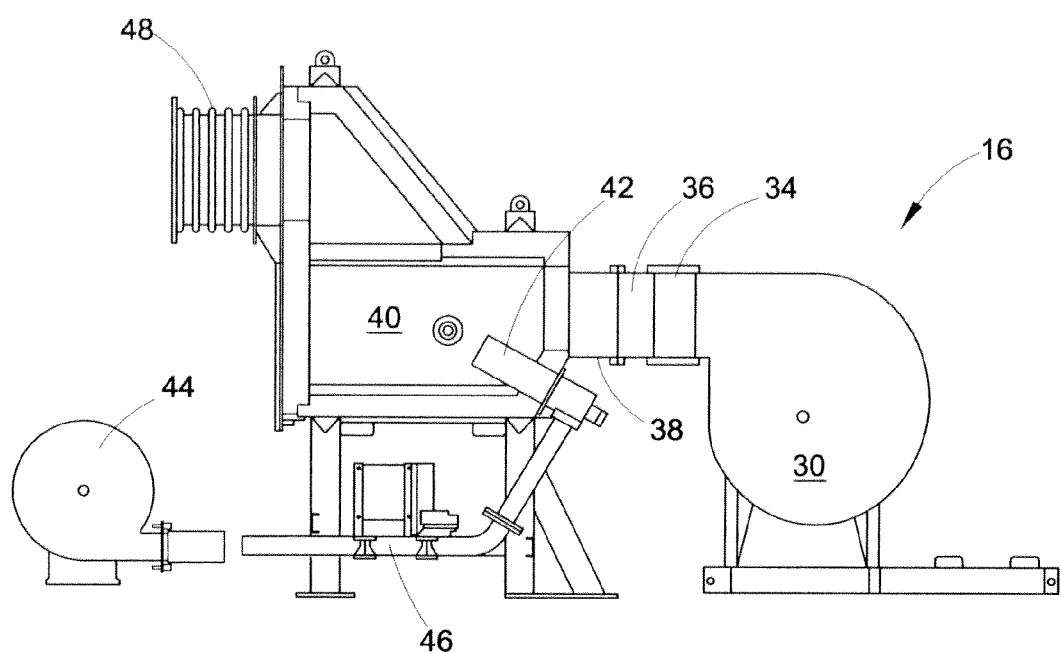
FIG. 4 is a side elevational view of the preheating station partially in cross-section.
Figure 5:
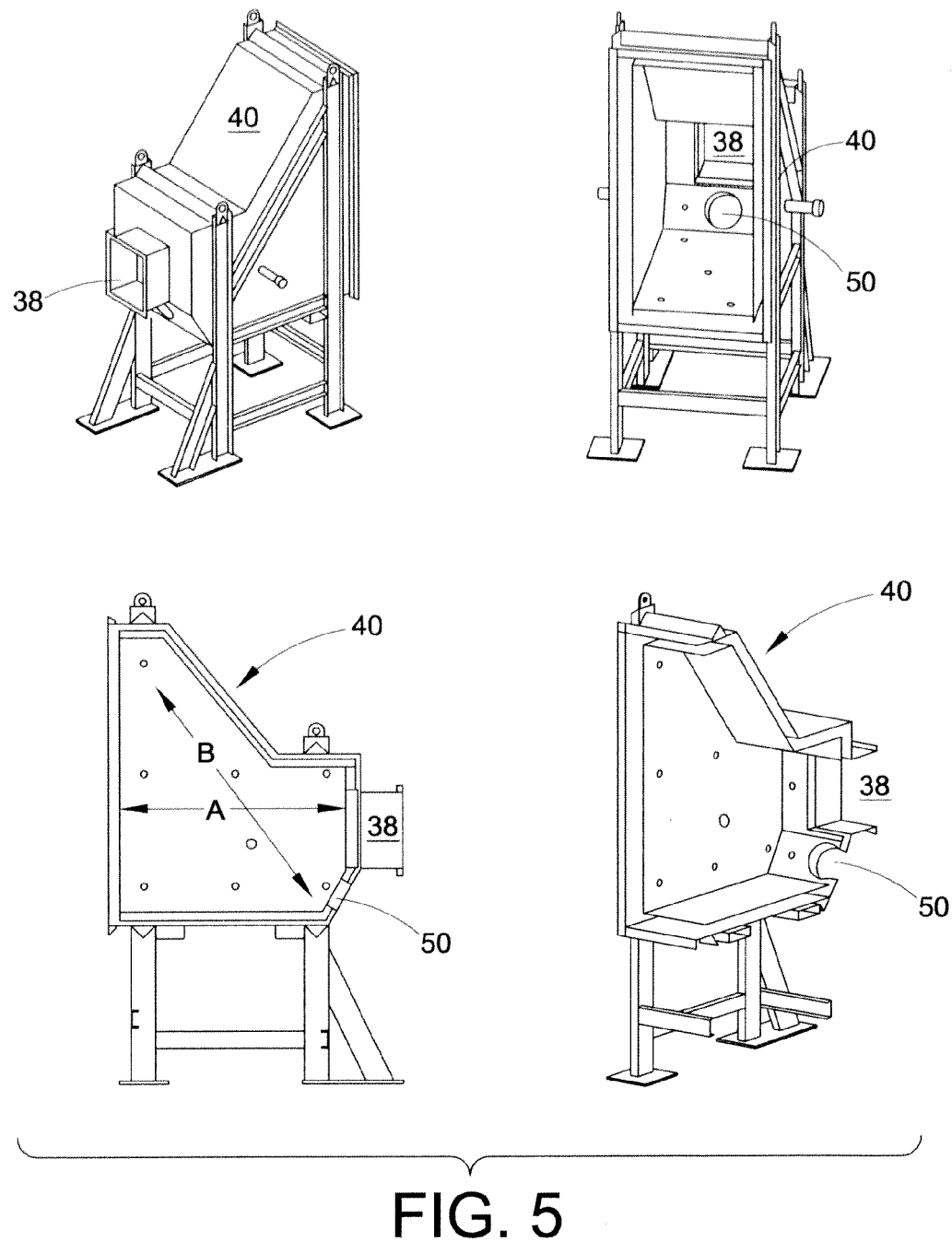
FIG. 5 is a plurality of views of the burner chamber.

As best shown in FIGS. 2-4, the preheating station 16 includes an exhaust gas fan 30 (fan blades/motor not shown) having inlet 32 and outlet 34. The exhaust gas fan 30 is in fluid communication, optionally via a conduit (not shown), to the furnace 14 and draws in exhaust gas through inlet 32. A flexible bellow 36 forms a conduit between exhaust gas fan outlet 34 and an inlet 38 to burner chamber 40. A burner 42 is inserted into burner chamber 40 at an end wall adjacent the inlet 38. In this manner the burner 42 extends into a path of flow of exhaust gas into the burner chamber 40. Preferably the burner 42 will have an adjustable degree of penetration into chamber 40 and also be vertically and horizontally adjustable to facilitate optimal placement. The burner 42 is controlled by burner fan 44 which forces air through conduit 46 into the burner 42. A flammable gas, such as natural gas or propane, is provided to the burner 42 through a feed line (not shown). It will be appreciated that, in an alternative exemplary embodiment, the burner can be an electric heating element, such as a resistive-type electric heating element, for example.

In this manner, exhaust gas entering burner chamber 40 through inlet 38 can be further heated by the activation of burner 42, before existing through outlet 48. As shown, burner chamber 40 has a first elongated dimension "A" in the plane of air being provided by the exhaust air flow. Burner chamber 40 includes a second elongated dimension "B" generally in a direction in which burner 42 is fired. Accordingly, burner injection inlet 50 generally faces outlet 48.

Without being bound by theory, it is believed that a burner extending into the exhaust gas flow achieves a Bernoulli (venturi) type of effect allowing it to operate at a very low flow when desired without being extinguished. Moreover, at times sufficient heat will be provided by the exhaust gases and additional burner heat will not be required. However, it is desirable that the burner remain lit to avoid inefficient purge requirements or other restarting delays.

The invention can use any available combustion gas exhaust from natural gas or propane combustion, as well as electric heat, and can accept from room temperature to 800° F. gasses. The auxiliary burner "fills in" when the waste heat is not fully available to reach a set point. A fresh air damper (not shown) can be opened to cool off the air if the set point is reached because the waste heat is too hot.

Preferably, the burner can fire at 0 to 10" W.G. (water column) of pressure and still remain lit—50:1 turn down ratio (stays lit uses minimal energy at idle). Similarly, the burner is positioned to fire at low fire with 0.3" W.G. (water column) back pressure in burner chamber. Surprisingly, if back pressure rises in the chamber the burner will still fire on low fire (0.3" W.G. (water column)) due to induced suction of process air velocity created by the novel design.

For a given processing rate (chip feed rate), the system is designed to run at constant mass flow (drying air), so as waste heat becomes less available the burner fan speed is programmed to run faster to compensate for decreasing density of the hot waste heat air. Alternatively, if the chip processing rate decreases, the system can be programmed to run invariable mass flow (process air/waste air) by varying the burner fan speed as the two variable (waste heat temperature and processing rate) change. This allows for excellent efficiency at any processing rate. It is believed that the system shown here can provide up to 40% savings on energy consumption.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A system for preheating scrap metal prior to delivery to a melting furnace, the system comprising:
   a conveyor station including:
      a scrap heating chamber;
      a scrap inlet for receiving scrap metal into the scrap heating chamber;
      a scrap outlet for discharging scrap metal from the scrap heating chamber; and
      a treatment gas inlet port disposed between the scrap inlet and the scrap outlet for receiving hot exhaust gas into the scrap heating chamber for heating the scrap metal;
   the system further comprising a gas preheating station including:
   a burner chamber including a hot exhaust gas inlet port for receiving hot exhaust gas from a hot exhaust gas source; and
      a hot exhaust gas outlet port; and
      a burner apparatus including a burner and an associated fan, the burner mounted within the burner chamber in a flow path between the exhaust inlet port and the outlet port, the burner configured to supply supplemental heat on demand to the preheating station to increase the hot exhaust gas temperature;
      wherein the hot exhaust gas outlet port is in fluid communication with the treatment gas inlet port of the conveyor station for delivering the hot exhaust gas thereto for heating the scrap metal.

2. A system as set forth in claim 1, wherein the hot exhaust gas source includes a melting furnace.

3. A system as set forth in claim 1, further comprising an exhaust gas fan for propelling the hot exhaust gas towards the treatment exhaust gas inlet port of the burner chamber.

4. A system as set forth in claim 1, wherein the conveyor chamber includes a conveyance mechanism for transporting the scrap metal between the scrap inlet and the scrap outlet.

5. A system as set forth in claim 4, wherein the conveyance mechanism includes a conveyor.

6. A system as set forth in claim 1, wherein the burner apparatus is positioned to fire in a general direction of the hot exhaust gas outlet port.

7. A system as set forth in claim 1, wherein the burner apparatus has an adjustable degree of penetration into the burner chamber.

8. A system as set forth in claim 1, wherein the burner apparatus is adjustably mounted within the burner chamber in at least one of the horizontal or vertical directions.

9. A scrap metal melting furnace system comprising:
    a melting furnace for melting scrap metal forming the source of hot exhaust gas; and
    a system as set forth in claim 1 for preheating the scrap metal.

10. A scrap metal melting furnace system as set forth in claim 9, wherein the scrap outlet of the preheating station is adjacent to a scrap intake of the melting furnace.

\* \* \* \* \*